United States Patent [19]
Lähteenmäki et al.

[11] Patent Number: 6,029,515
[45] Date of Patent: Feb. 29, 2000

[54] NAVIGATION SYSTEM FOR DIVING OPERATIONS

[75] Inventors: Ari Lähteenmäki, Helsinki; Ari Nikkola, Espoo, both of Finland

[73] Assignee: Suunto Oy, Espoo, Finland

[21] Appl. No.: 08/768,842

[22] Filed: Dec. 18, 1996

[30] Foreign Application Priority Data

Dec. 21, 1995 [FI] Finland .................................. 956163

[51] Int. Cl.⁷ .................................................. G01C 21/00
[52] U.S. Cl. ......................................................... 73/178 R
[58] Field of Search ........................... 73/178 R; 342/58; 356/5.01; 367/6, 127, 128, 129, 131, 134, 910; 33/355 R, 361

[56] References Cited

U.S. PATENT DOCUMENTS

| | | | |
|---|---|---|---|
| 3,489,993 | 1/1970 | Massa, Jr. ..................................... | 340/6 |
| 3,736,551 | 5/1973 | Hirsch ....................................... | 340/5 R |
| 4,037,328 | 7/1977 | Kuehn et al. ............................... | 33/349 |
| 4,103,279 | 7/1978 | Dildy, Jr. et al. ......................... | 340/3 D |
| 5,148,412 | 9/1992 | Suggs ........................................ | 367/131 |
| 5,185,725 | 2/1993 | Kent et al. ................................. | 367/6 |
| 5,187,871 | 2/1993 | McDermott ................................ | 33/354 |
| 5,241,516 | 8/1993 | Kruchowy et al. ....................... | 367/118 |
| 5,303,206 | 4/1994 | Bemb et al. .............................. | 367/127 |

FOREIGN PATENT DOCUMENTS 4444942  6/1996  Germany.

*Primary Examiner*—William Oen
*Attorney, Agent, or Firm*—Steinberg & Raskin, P.C.

[57] ABSTRACT

A navigation system and method for diving operation in view of facilitating navigation under water to a specific location, in particular navigation back to a dive starting point, i.e., to the place from which the diving was started. The system includes a base station fixed to the starting point, such as a boat or equivalent, and arranged to transmit a signal to its environment, and a mobile unit carried along by the diver. The mobile unit includes a compass and a locating part which receives the signal transmitted by the base station. The locating part converts the signal to information on the return direction, and combines the information on the return direction with the magnetic information on the direction obtained from the compass, so that the information on the return direction from the position of the diver when the signal is received is maintained irrespective of the momentary location and position of the diver and the mobile unit.

21 Claims, 1 Drawing Sheet

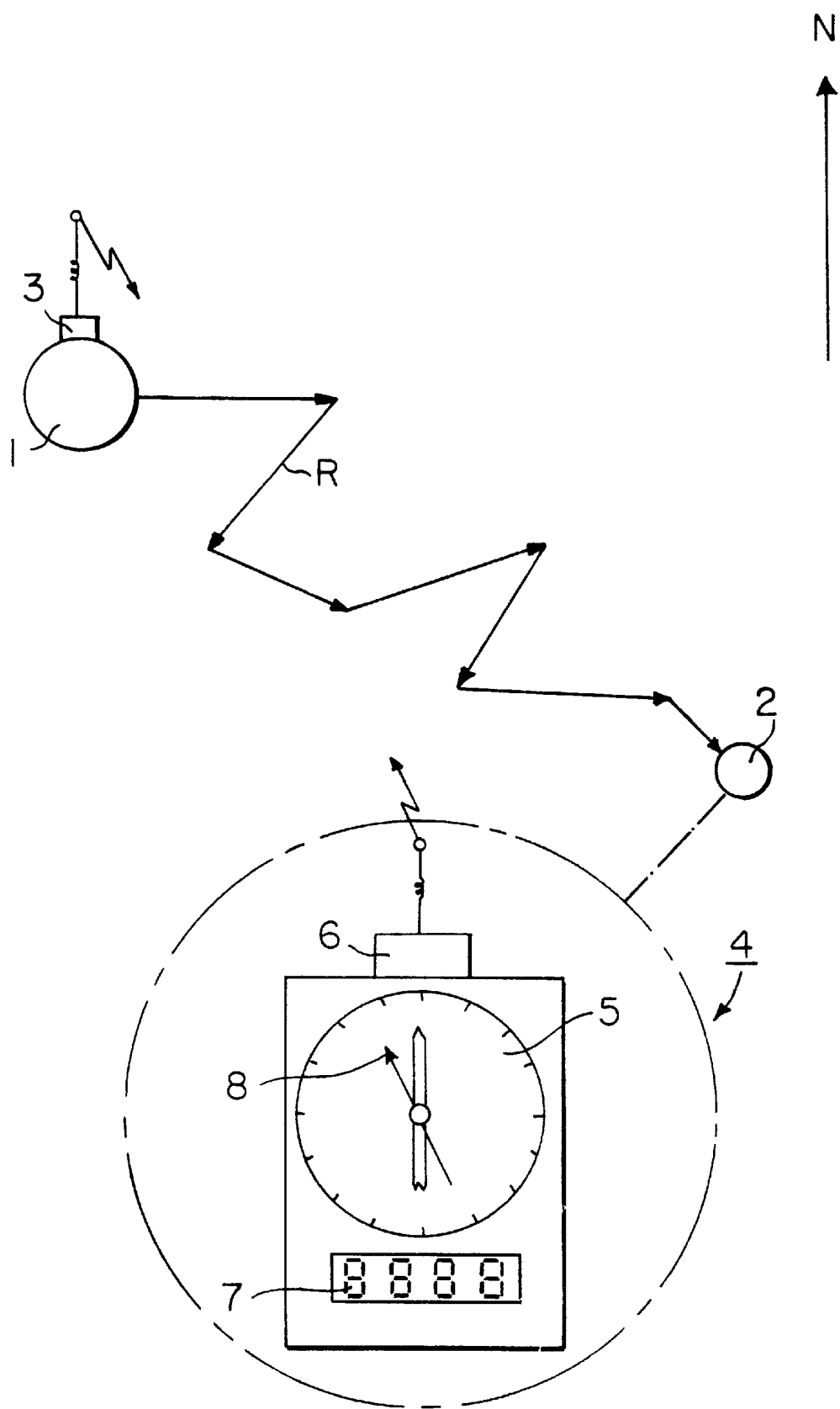

NAVIGATION SYSTEM FOR DIVING OPERATIONS

FIELD OF THE INVENTION

The invention relates to a navigation system and method intended for diving operation in view of facilitating navigation under water to a specific location, in particular, navigation back to the starting point, i.e. to the place from which the diving was started.

BACKGROUND OF THE INVENTION

Divers start each dive from a certain starting point, such as a boat or an equivalent base station, from which the diver often moves further away during diving. Thus, at the end of the diving, the diver must find his way back to this starting point, and therefore the diver must be capable of orientating or, more appropriately, navigating under water. Most commonly, this navigation has been carried out by means of a compass, and in some cases, in particular in conditions with poor visibility, a rope has also been used as an aid, which rope has been attached both to the starting point, such as a boat, and to the diver.

When the movement takes place from the base station substantially only in one direction, by means of a compass it is rather easy to find the path back to this base station. The use of a compass in navigation so as to find the base station, i.e., the starting point, however, becomes considerably more difficult if the route passed by the diver has not been linear, if there have been sea currents in the area, or if the base station, such as a boat, has moved away from its place during diving. Moreover, the use of a compass is quite difficult for most divers, for a number of reasons, and its use requires constant attention. Further, when a compass is used, it is necessary to remember any turns that have been made during the diving, to take into account the effects of sea currents, etc.

OBJECTS AND SUMMARY OF THE INVENTION

It is an object of the present invention to provide a novel navigation system and arrangement intended for diving operation to facilitate the ease of the diver and the finding of the correct direction back to the base station or to another initial starting location or to any location at which the diver wants to arrive at.

It is another object of the present invention to provide a new and improved method for directing a diver to a specific location or base station, e.g., a location from which he or she left at the start of the dive.

In view of achieving these objects and others, the invention is mainly characterized in that the arrangement comprises a base station fixed to a location at which the diver wants to arrive, often the starting point of the dive, such as a boat or equivalent, which base station is arranged to transmit a signal to its environment, and a mobile unit carried along by the diver, which mobile unit includes a compass and a locating part, which is adapted to receive the signal transmitted by the base station and convert this signal to information on the return direction of the diver with respect to the base station. The locating part or locating means also combine the information on the return direction with the magnetic information on the direction obtained from the compass so that the information on the return direction is maintained after the signal has been received irrespective of the momentary location and position of the diver and the mobile unit, e.g., regardless of whether the diver has moved from the position at which the signal was received.

By means of the present invention, a number of advantages are obtained compared with the prior art and with the auxiliary equipment currently available to divers, of which advantages, for example, the following can be mentioned. By means of the navigation arrangement in accordance with the invention, the finding or location of the base station, such as the boat or an equivalent starting point, is facilitated considerably.

Further, by means of the arrangement in accordance with the invention, both the effects of sea currents and the effects of a diving route with curves and elbows are eliminated. It results again from this that, during diving, the diver does not have to pay any particular attention to the direction in which he moves, but he can fully concentrate on the original objective of the dive or diving assignment. When the diver wishes to return to his starting point, by means of the arrangement in accordance with the invention it is easy to determine both the direction and the distance to the target.

The method for facilitating navigation for a diver under water to return to an initial location in accordance with the invention comprises fixing a base station to the initial location, transmitting a signal from the base station, and determining information on a return direction from the current position of a mobile unit being carried along by the diver to the base station. The return direction information step entails receiving the signal transmitted from the base station and converting the signal to information on the return direction (at the time the signal is received or shortly thereafter). Also, the information on the return direction is maintained irrespective of the momentary location and position of the diver by combining the information on the return direction with magnetic information on the current position of the diver obtained from a compass arranged in the mobile unit. The momentary location of the mobile unit with respect to the base station can be determined from the signal transmitted from the base station, e.g., based on the determined intensity of the signal transmitted from the base station and based on the travel time of the signal transmitted from the base station to the mobile unit. The information on the return direction from the current position of the mobile unit carried along by the diver to the base station as well as the momentary location of the mobile unit with respect to the base station can be continually determined, determined at certain predetermined time intervals, or determined at desired time manually by the diver, from the signal transmitted from the base station. Further, in certain embodiments, it is possible to transmit data from the mobile unit to the base station by arranging a transmitter in connection with the mobile unit and arranging a receiver on connection with the base station.

Further advantages and characteristic features of the invention will come out in more detail from the following detailed description of the invention.

BRIEF DESCRIPTION OF THE DRAWINGS

The following drawing is illustrative of an embodiment of the invention and is not meant to limit the scope of the invention as encompassed by the claims.

The FIGURE illustrates the navigation system in accordance with the invention during diving and can be used in the method in accordance with the invention.

DETAILED DESCRIPTION OF THE PREFERRED EMBODIMENTS

The navigation system in accordance with the invention comprises a mobile unit carried along by the diver and a "stationary" base station attached, for example, to a boat or equivalent diving station, which units include means for communicating with one another. In the drawing, the base station is denoted by reference numeral 1, the diver is denoted by reference numeral 2 and the mobile or portable unit is denoted by reference numeral 4. The base station 1 includes a communication module 3 such as a transmitter, which communication module 3 can also constitute a transmitter-receiver in view of more versatile communication between the base station and the diver. The mobile unit 4 includes a compass 5 as well as a locating portion, which consists of a communication module 6 such as a receiver (which communication module 6 can be substituted for by a transmitter-receiver in view of more versatile communication with the base station, if desired) and a processor or an equivalent data processing unit provided with a memory and a display 7. Thus, by means of the system, the location of the diver 2 or, more correctly, of the mobile unit 4 carried along by the diver in relation to the base station 1 is determined. In the simplest form of the system, the determination of the location of the mobile unit means just the determination of the direction, i.e., not the actual physical location. This takes place whereby the transmitter 2 of the base station 1 transmits a signal, which is received by the receiver 6 of the locating part of the mobile unit 4, after which the data processing unit determines the direction from the mobile unit 4 to the base station 1, which direction is displayed, for example, by means of a directional arrow 8 provided in the compass 5. The signal can be based, for example, on ultrasound, on electromagnetic wave movement, for example radio waves, or on light.

The determination of the location can be carried out either as constant measurement, as measurements taking place at certain time intervals, or at desired time intervals, or as desired by manually switching on of the system by the diver. The information on the location of the diver, in this particular case exclusively the direction to the base station 1, is stored in the memory of the locating part, in which case, by making use of the compass 5, it is possible to maintain the direction backwards upon completion of the dive when it is desirable to return to the starting point even if the determination of location were not carried out as a constant operation. As is illustrated in the figure in the drawing, the route R of the diver can be even highly twisting. This has, however, no significance for the determination of the direction (or of the distance).

As stated above, by means of the system in accordance with the invention, the distance of the diver from the base station 1 is also determined. This can be based, for example, on the locating part measuring the intensity of the signal transmitted by the transmitter 3 of the base station 1 or the time of travel of the signal between the base station 1 and the portable unit 4 while converting this data to a value of distance, which is shown in the display 7. Determination of the direction and the distance to the base station 1 in a situation in which locating has not yet been carried out is performed so that, by means of the locating part, the direction to the base station 1 is sought by means of direction-finding, in which connection, during the intervals when no measurement is carried out, the information on the direction of the base station is maintained based on the information obtained from the compass 5. Measurement of the direction and the distance requires that the locating part points at least approximately in the direction of the base station. Once the direction of the base station has been determined, this directional information is maintained in the locating part based on the magnetic information on direction obtained from the compass irrespective of whether the diver moves back to the base station along a direct or curved path. However, it is preferable to carry out the determination of the location constantly or at certain time intervals, because in such a case the correct return direction is corrected constantly. In determination of the distance, in order that precise information could be obtained, it is necessary to carry out the measurement constantly or at certain time intervals. If this is not done, the determination of the location must be carried out by direction-finding when needed.

The system can be carried into effect as a number of different versions, of which in the most versatile versions, besides determination of the direction and the distance between the base station and the diver, by means of the system it is also possible to transfer other information between the base station and the diver to a limited extent. In such an embodiment, it is required that both the base station and the mobile unit are provided with transmitter-receivers. As such, by means of a certain signal, the base station might, for example, ask the diver to come back, or similarly, the diver might transmit a message in the form of a certain signal to the base station indicating that he needs help. Also, the base station could determine the distance and the direction of the diver in relation to the base station precisely.

Above, the invention has been described completely by way of example with the aid of the schematic illustration in the accompanying drawing. The invention is, however, not confined to the exemplifying embodiment illustrated in this figure or discussed above, but different embodiments of the invention can show variation within the scope of the inventive idea defined in the accompanying patent claims.

We claim:

1. A spatial orientation system to facilitate navigation for a diver under water, comprising
   a base station fixable at a location to which the diver wants to arrive after completing a dive, said base station comprising transmitter means for transmitting a signal, and
   a mobile unit adapted to be carried by the diver, said mobile unit comprising a compass and locating means for determining information on a return direction from the current position of said mobile unit to said base station, said locating means comprising
      receiving means for receiving the signal transmitted by said transmitter means of said base station,
      converting means for converting the signal to information on the return direction of said mobile unit to said base station upon receipt of the signal by said receiving means, and
      combining means for combining said information on the return direction of said mobile unit to said base station from said converting means with magnetic information on the current position of the diver obtained from said compass in order to maintain current information on the return direction irrespective of the momentary location and position of the diver and said mobile unit.

2. The navigation system of claim 1, wherein said locating means of said mobile unit comprises means for determining the location of said mobile unit with respect to said base station from the signal transmitted by said transmitter means of said base station upon receipt of the signal by said locating means.

3. The navigation system of claim 2, wherein said momentary location determining means determine the intensity of said signal transmitted by said transmitter means of said base station and based on the intensity, determine the momentary location of said mobile unit with respect to said base station.

4. The navigation system of claim 2, wherein said momentary location determining means determine the travel time of said signal transmitted by said transmitter means from said base station to said mobile unit and based on the travel time, determine the momentary location of said mobile unit with respect to said base station.

5. The navigation system of claim 2, wherein said locating means of said mobile unit is arranged to continually determine information on the return direction from the current position of said mobile unit to said base station and continually determine the momentary location of said mobile unit with respect to said base station from the signal transmitted by said transmitter means of said base station.

6. The navigation system of claim 2, wherein said locating means of said mobile unit is arranged to determine information on the return direction from the current position of said mobile unit to said base station only at certain predetermined time intervals and determine the momentary location of said mobile unit with respect to said base station from the signal transmitted by said transmitter means of said base station only at certain predetermined time intervals.

7. The navigation system of claim 2, wherein said locating means of said mobile unit is arranged to be manually switched on by the diver to determine information on the return direction from the current position of said mobile unit to said base station and determine the momentary location of said mobile unit with respect to said base station from the signal transmitted by said transmitter means of said base station.

8. The navigation system of claim 1, wherein said base station further comprises receiver means and said mobile unit further comprises transmitter means such that a two-way connection is established between said base station and said mobile unit.

9. The navigation system of claim 1, wherein said transmitter means of said base station are structured and arranged to transmit an ultrasound signal.

10. The navigation system of claim 1, wherein said transmitter means of said base station are structured and arranged to transmit an electromagnetic wave.

11. The navigation system of claim 1, wherein said transmitter means of said base station are structured and arranged to transmit light to be received by said mobile unit.

12. The navigation system of claim 1, wherein said base station is fixed at the location at which the diver began the dive.

13. A method for facilitating navigation for a diver under water to arrive a specific location, comprising fixing a base station to the location, transmitting a signal from the base station, determining information on a return direction from the current position of a mobile unit being carried along by the diver to said base station, said return direction information determining step comprising the steps of receiving the signal transmitted from said base station and converting the signal to information on the return direction, and maintaining the information on the return direction irrespective of the momentary location and position of the diver by combining the information on the return direction with magnetic information on the current position of the diver obtained from a compass arranged in the mobile unit.

14. The method of claim 13, further comprising the step of:

determining the momentary location of said mobile unit with respect to said base station from the signal transmitted from said base station.

15. The method of claim 13, further comprising the steps of:

determining the intensity of the signal transmitted from said base station, and determining the momentary location of said mobile unit with respect to said base station based on the intensity.

16. The method of claim 13, further comprising the steps of:

determining the travel time of the signal transmitted from said base station from said base station to said mobile unit, and determining the momentary location of said mobile unit with respect to said base station based on the travel time.

17. The method of claim 13, further comprising the steps of:

continually determining information on the return direction from the current position of said mobile unit carried along by the diver to said base station, and continually determining the momentary location of said mobile unit with respect to said base station from the signal transmitted from said base station.

18. The method of claim 13, further comprising the steps of:

determining information on the return direction from the current position of said mobile unto carried along by the diver to said base station only at certain predetermined time intervals, and determining the momentary location of said mobile unit with respect to said base station from the signal transmitted from said base station only at certain predetermined time intervals.

19. The method of claim 13, further comprising the steps of:

transmitting data from said mobile unit to said base station by arranging a transmitter in connection with said mobile unit and arranging a receiver on connection with said base station.

20. The method of claim 13, wherein said base station is fixed at the location at which the diver began the dive.

21. A spatial orientation system for diving operation to facilitate navigation for a diver under water, comprising a base station fixable at a location to which the diver wants to arrive after completing a dive, said base station comprising a transmitter for transmitting a signal, and a mobile unit adapted to be carried by the diver, said mobile unit comprising a compass and a locating system for determining information on a return direction from the current position of said mobile unit to said base station, said locating system being arranged to receive the signal transmitted by said transmitter of said base station, convert the signal to information on the return direction of said mobile unit to said base station upon receipt of the signal by said locating system, and combine said information on the return direction of said mobile unit to said base station with magnetic information on the current position of the diver obtained from said compass in order to maintain current information on the return direction irrespective of the momentary location and position of the diver and said mobile unit.

* * * * *